(12) United States Patent  (10) Patent No.: US 7,603,844 B2
Moniz et al.  (45) Date of Patent: Oct. 20, 2009

(54) GAS TURBINE ENGINE ASSEMBLY AND METHODS OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 560 days.

(21) Appl. No.: 11/253,415

(22) Filed: Oct. 19, 2005

(65) Prior Publication Data

US 2007/0084183 A1  Apr. 19, 2007

(51) Int. Cl.
F02K 3/00 (2006.01)
(52) U.S. Cl. .......................... 60/268; 415/174.4; 416/2; 60/39.162
(58) Field of Classification Search ............... 60/268, 60/226.1, 39.162; 415/9, 174.4; 416/2
See application file for complete search history.

(56) References Cited

U.S. PATENT DOCUMENTS

| | | | |
|---|---|---|---|
| 3,729,957 A * | 5/1973 | Petrie et al. .............. 60/226.1 |
| 3,866,415 A * | 2/1975 | Ciokajlo .................... 60/226.1 |
| 4,005,575 A * | 2/1977 | Scott et al. ................. 60/226.1 |
| 4,251,987 A * | 2/1981 | Adamson ..................... 60/805 |
| 4,751,816 A * | 6/1988 | Perry ......................... 60/226.1 |
| 4,827,712 A * | 5/1989 | Coplin ....................... 60/226.1 |
| 5,010,729 A | 4/1991 | Adamson et al. |
| 5,806,303 A | 9/1998 | Johnson |
| 5,809,772 A | 9/1998 | Giffin, III et al. |
| 5,813,214 A | 9/1998 | Moniz et al. |
| 5,867,980 A | 2/1999 | Bartos |
| 5,974,782 A * | 11/1999 | Gerez .......................... 60/204 |
| 6,158,210 A * | 12/2000 | Orlando ..................... 60/226.1 |
| 6,364,603 B1 * | 4/2002 | Czachor et al. .............. 415/9 |
| 6,381,948 B1 * | 5/2002 | Klingels .................... 60/226.1 |
| 6,619,030 B1 | 9/2003 | Seda et al. |
| 6,622,473 B2 * | 9/2003 | Becquerelle et al. ....... 60/226.1 |
| 6,684,626 B1 | 2/2004 | Orlando et al. |
| 6,711,887 B2 | 3/2004 | Orlando et al. |
| 6,732,502 B2 | 5/2004 | Seda et al. |
| 6,739,120 B2 | 5/2004 | Moniz et al. |
| 6,763,652 B2 | 7/2004 | Baughman et al. |
| 6,763,653 B2 | 7/2004 | Orlando et al. |
| 6,763,654 B2 | 7/2004 | Orlando et al. |
| 2007/0084184 A1 * | 4/2007 | Orlando et al. ............... 60/204 |
| 2007/0084185 A1 * | 4/2007 | Moniz et al. ................. 60/204 |
| 2007/0084186 A1 * | 4/2007 | Orlando et al. ............... 60/204 |
| 2007/0084187 A1 * | 4/2007 | Moniz et al. ................. 60/204 |
| 2007/0084188 A1 * | 4/2007 | Orlando et al. ............... 60/204 |
| 2007/0084189 A1 * | 4/2007 | Moniz et al. ................. 60/204 |
| 2007/0084190 A1 * | 4/2007 | Moniz et al. ................. 60/204 |
| 2007/0240399 A1 * | 10/2007 | Orlando et al. ........... 60/39.162 |
| 2008/0098716 A1 * | 5/2008 | Orlando et al. ............. 60/226.1 |

* cited by examiner

*Primary Examiner*—William H Rodriguez
(74) *Attorney, Agent, or Firm*—William Scott Andes, Esq.; Armstrong Teasdale LLP

(57) ABSTRACT

A method for assembling a gas turbine engine includes coupling a low-pressure turbine to a core turbine engine, coupling a gearbox to the low-pressure turbine, coupling a first fan assembly to the gearbox such that the first fan assembly rotates in a first direction, and coupling a mechanical fuse between the first fan assembly and the low-pressure turbine such that the mechanical fuse fails at a predetermined moment load.

16 Claims, 4 Drawing Sheets

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine, and a low-pressure turbine coupled together in a serial flow relationship. More specifically, the compressor and high-pressure turbine are coupled through a shaft to define a high-pressure rotor assembly. Air entering the core engine is then mixed with fuel and ignited to form a high energy gas stream. The gas stream flows through the high-pressure turbine, rotatably driving it, such that the shaft that, in turn, rotatably drives the compressor.

The gas stream expands as it flows through the low-pressure turbine. The low-pressure turbine rotatably drives the fan through a low-pressure shaft such that a low-pressure rotor assembly is defined by the fan, the low-pressure shaft, and the low-pressure turbine. To facilitate increasing engine efficiency, at least one known gas turbine engine includes a counter-rotating low-pressure turbine that is coupled to a counter-rotating fan and/or a counter-rotating booster compressor.

To assemble a gas turbine engine including a counter-rotating low-pressure turbine, an outer rotating spool, a rotating frame, a mid-turbine frame, and two concentric shafts are installed within the gas turbine engine to facilitate supporting the counter-rotating turbine. The installation of the aforementioned components also enables a first fan assembly to be coupled to a first turbine and a second fan assembly to be coupled to a second turbine such that the first and second fan assemblies each rotate in the same rotational direction as the first and second turbines. Accordingly, the overall weight, design complexity, and/or manufacturing costs of such an engine are increased. Moreover, to facilitate supporting the fan assemblies, at least one of the fan assemblies is supported on a plurality of bearing assemblies. During operation of the engine, a fragment of a fan blade may become separated from the remainder of the blade. Accordingly, a substantial rotary unbalance load may be created within the damaged fan and carried substantially by the fan shaft bearings, the fan bearing supports, and the fan support frames.

To minimize the effects of potentially damaging abnormal imbalance loads, known engines include support components for the fan rotor support system that are sized to provide additional strength for the fan support system. However, increasing the strength of the support components may also increase an overall weight of the engine and decrease an overall efficiency of the engine when the engine is operated without substantial rotor imbalances.

BRIEF DESCRIPTION OF THE FIGURES

In one aspect, a method of assembling a turbine engine is provided. The method includes coupling a low-pressure turbine to a core turbine engine, coupling a gearbox to the low-pressure turbine, coupling a first fan assembly to the gearbox such that the first fan assembly rotates in a first direction, and coupling a mechanical fuse between the first fan assembly and the low-pressure turbine such that the mechanical fuse fails at a predetermined moment load.

In another aspect, a counter-rotating fan assembly is provided. The counter-rotating fan assembly includes a gearbox coupled to a low-pressure turbine, a first fan assembly coupled to the gearbox, the first fan assembly comprising a disk and a plurality of rotor blades coupled to the disk and configured to rotate in a first rotational direction, and a mechanical fuse coupled between the first fan assembly and the low-pressure turbine such that the mechanical fuse fails at a predetermined moment load.

In a further aspect, a turbine engine assembly is provided. The turbine engine assembly includes a core turbine engine, a low-pressure turbine coupled to the core turbine engine, a gearbox coupled to the low-pressure turbine, a first fan assembly coupled to the gearbox, the first fan assembly comprising a disk and a plurality of rotor blades coupled to the disk and configured to rotate in a first rotational direction, and a mechanical fuse coupled between the first fan assembly and the low-pressure turbine such that the mechanical fuse fails at a predetermined moment load.

BRIEF DESCRIPTION OF THE DRAWINGS

Figure 1:
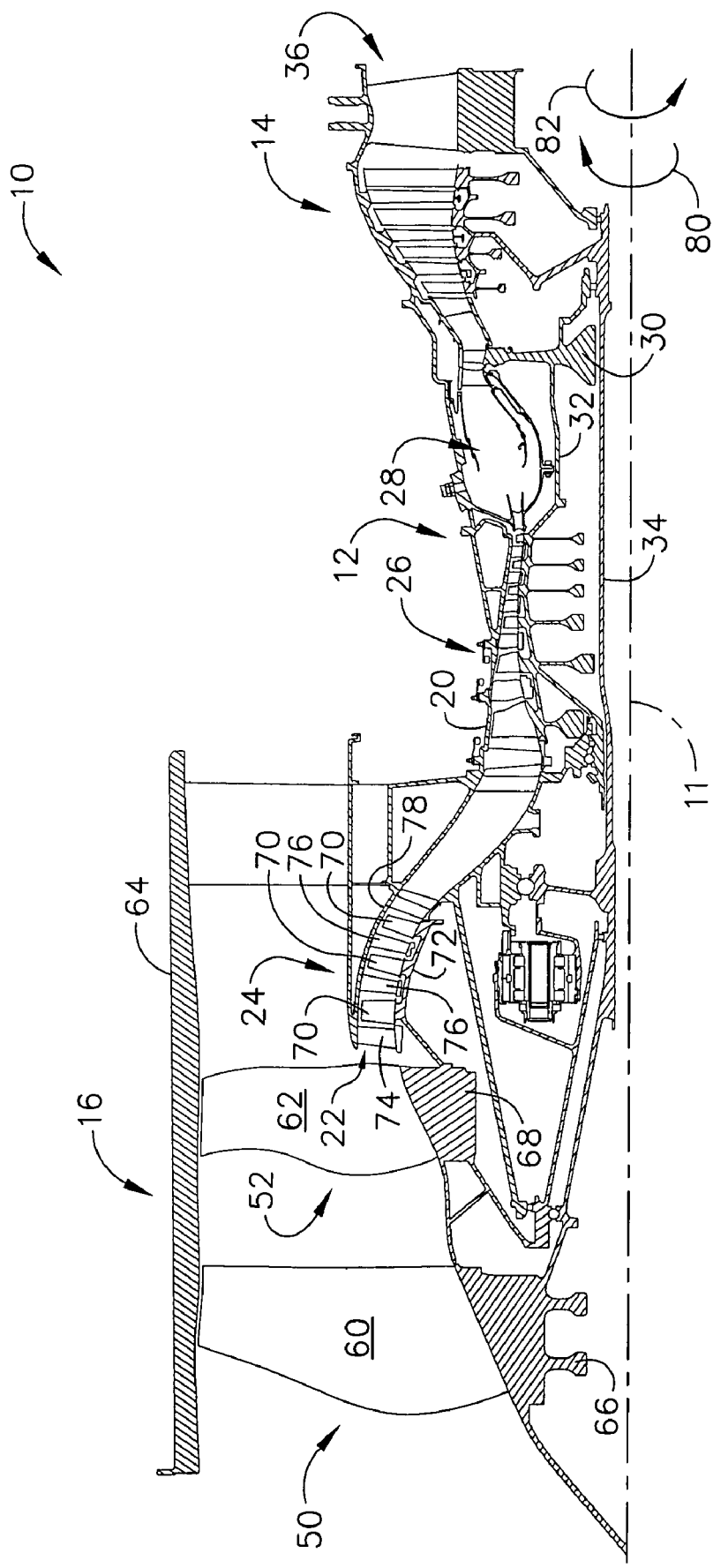
Figure 2:
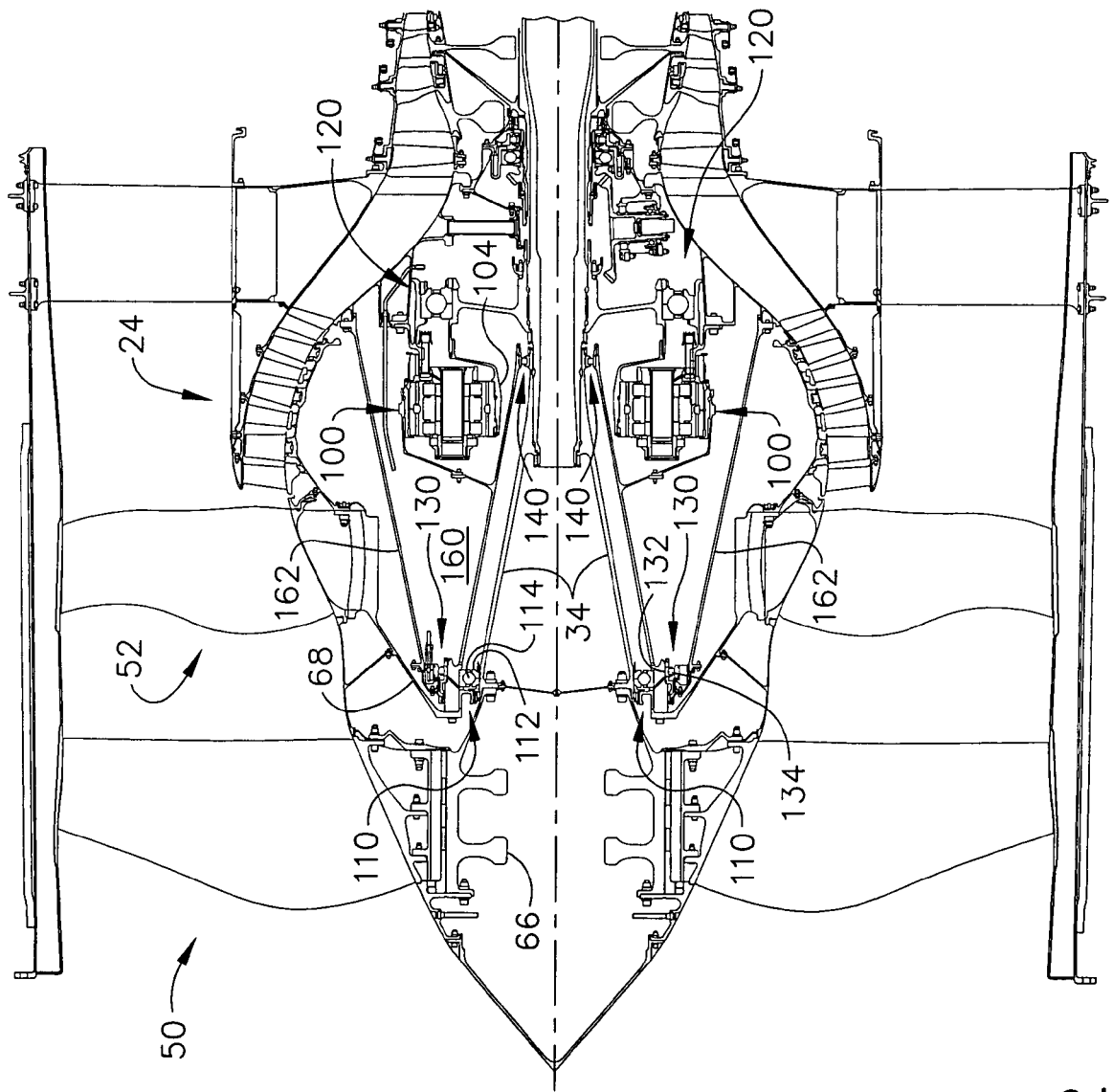
Figure 3:
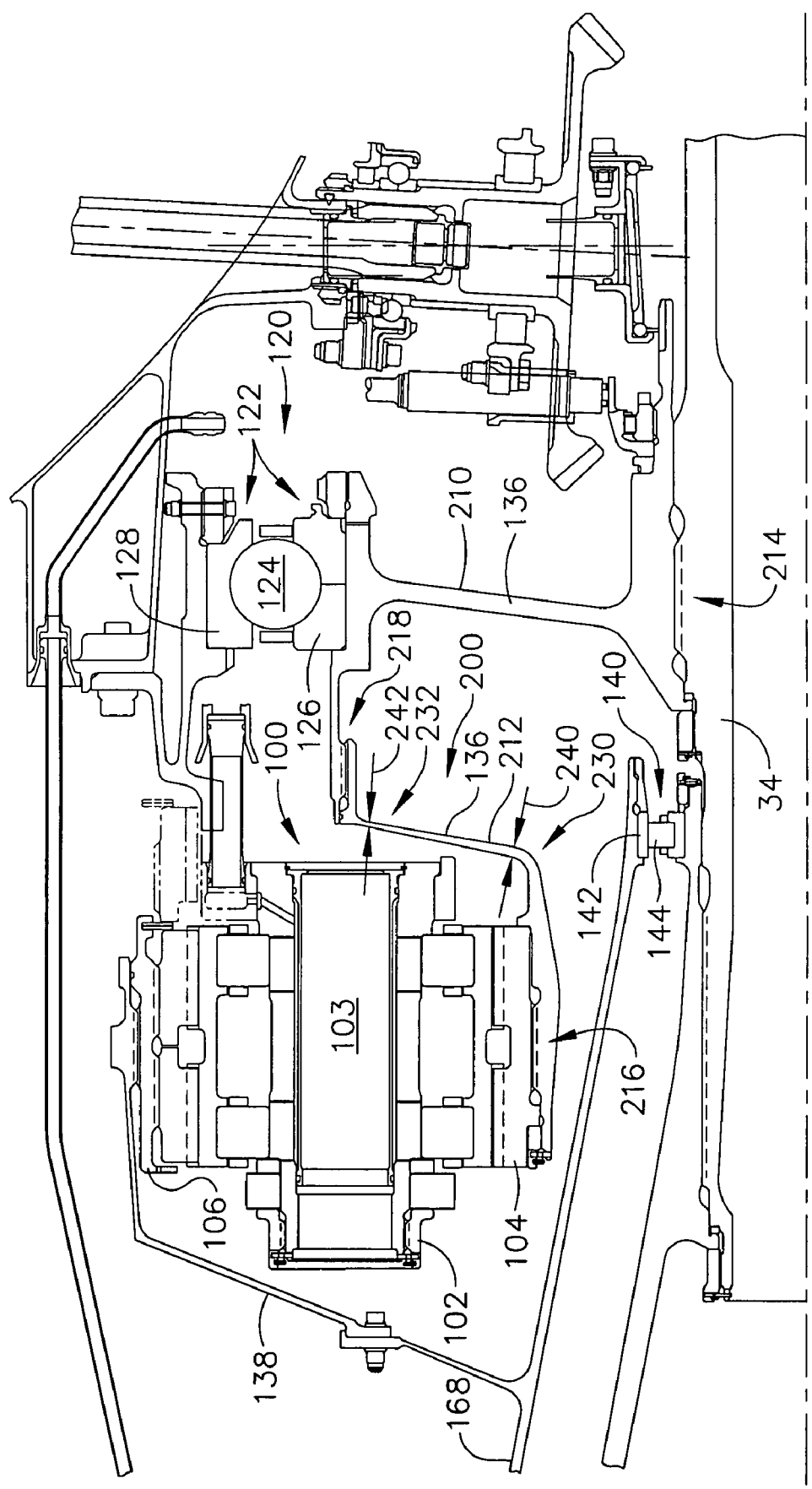
Figure 4:
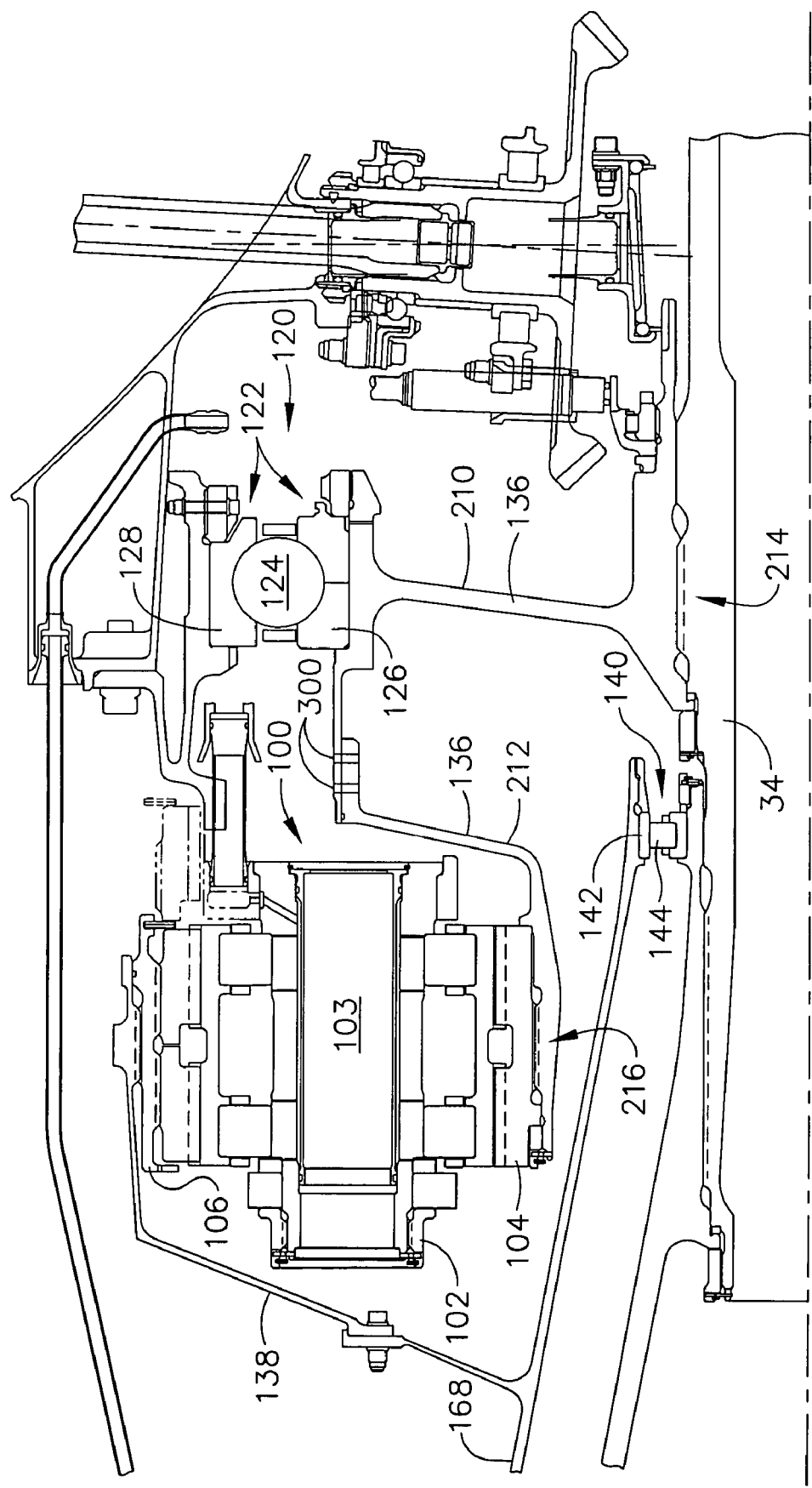

FIG. 1 is a cross-sectional view of a portion of an exemplary turbine engine assembly;

FIG. 2 is an enlarged cross-sectional view of a portion of the counter-rotating fan assembly shown in FIG. 1; and FIG. 3 is an enlarged cross-sectional view of a portion of the counter-rotating fan assembly shown in FIG. 2 that includes a mechanical fuse; and FIG. 4 is an enlarged cross-sectional view of a portion of the counter-rotating fan assembly shown in FIG. 2 that includes another exemplary mechanical fuse.

DETAILED DESCRIPTION OF THE INVENTION

FIG. 1 is a cross-sectional view of a portion of an exemplary turbine engine assembly 10 having a longitudinal axis 11. In the exemplary embodiment, turbine engine assembly 10 includes a core gas turbine engine 12, a low-pressure turbine 14 that is coupled axially aft of core gas turbine engine 12, and a counter-rotating fan assembly 16 that is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first drive shaft 32, and then to second or low-pressure turbine 14 to facilitate driving counter-rotating fan assembly 16 and booster compressor 24 through a second drive shaft 34 that is coupled coaxially with first drive shaft 32. After driving low-pressure turbine 14, the combustion products leave turbine engine assembly 10 through an exhaust nozzle 36 to provide propulsive jet thrust.

Counter-rotating fan assembly 16 includes a forward fan assembly 50 and an aft fan assembly 52 disposed about longitudinal centerline axis 11. The terms "forward fan" and "aft fan" are used herein to indicate that fan assembly 50 is coupled axially upstream from fan assembly 52. In the exemplary embodiment, fan assemblies 50 and 52 are positioned at a forward end of core gas turbine engine 12 as illustrated. In an alternative embodiment, fan assemblies 50 and 52 are each positioned at an aft end of core gas turbine engine 12. Fan assemblies 50 and 52 each include at least one row of rotor blades 60 and 62, respectively, and are each positioned within a nacelle 64. Blades 60 and 62 are coupled to respective rotor disks 66 and 68.

In the exemplary embodiment, booster compressor 24 includes a plurality of rows of rotor blades 70 that are coupled to a respective rotor disk 72. In the exemplary embodiment, booster compressor 24 is positioned aft of an inlet guide vane assembly 74 and is coupled to aft fan assembly 52 such that booster compressor 24 rotates at a rotational speed that is substantially equal to a rotational speed of aft fan assembly 52. Although booster compressor 24 is shown as having only three rows of rotor blades 70, it should be realized that booster compressor 24 may have a single row of rotor blades 70, or a plurality of rows of rotor blades 70 that are interdigitated with a plurality of rows of guide vanes 76. In one embodiment, inlet guide vanes 76 are fixedly coupled to a booster case 78. In another embodiment, rotor blades 70 are rotatably coupled to rotor disk 72 such that inlet guide vanes 76 are movable during engine operation to facilitate varying a quantity of air channeled through booster compressor 24. In an alternative embodiment, turbine engine assembly 10 does not include booster compressor 24.

In the exemplary embodiment, low-pressure turbine 14 is coupled to forward fan assembly 50 through shaft 34 such that low-pressure turbine 14 and forward fan assembly 50 rotate in a first rotational direction 80, and aft fan assembly 52 is coupled to low-pressure turbine 14 such that aft fan assembly 52 rotates in an opposite second direction 82.

FIG. 2 is a schematic diagram of a portion of counter-rotating fan assembly 16 shown in FIG. 1. FIG. 3 is a schematic diagram of a portion of the counter-rotating fan assembly 16 shown in FIG. 2 including an exemplary mechanical fuse 200. In the exemplary embodiment, counter-rotating fan assembly 16 also includes a gearbox 100 that is coupled between aft fan assembly 52 and second drive shaft 34 to facilitate rotating aft fan assembly 52 in a second opposite direction 82 than forward fan assembly 50.

In one embodiment, gearbox assembly 100 has a gear ratio of approximately 2 to 1 such that forward fan assembly 50 rotates at a rotational speed that is approximately twice the rotational speed of aft fan assembly 52. In another embodiment, forward fan assembly 50 rotates with a rotational speed that is between approximately 0.9 and 2.1 times faster than the rotational speed of aft fan assembly 52. In another embodiment, forward fan assembly 50 rotates at a rotational speed that is approximately 1.5 times faster than the rotational speed of aft fan assembly 52. In a further embodiment, forward fan assembly 50 rotates at a rotational speed that is approximately 0.67 times the rotational speed of aft fan assembly 52. Accordingly, in the exemplary embodiment, forward fan assembly 50 rotates at a rotational speed that is faster than the rotational speed of aft fan assembly 52. In an alternative embodiment, forward fan assembly 50 rotates at a rotational speed that is slower than the rotational speed of aft fan assembly 52. In the exemplary embodiment, gearbox 100 is a planetary gearbox that substantially radially circumscribes shaft 34 and includes a support structure 102, at least one gear 103 coupled within support structure 102, an input 104, and an output 106.

In the exemplary embodiment, turbine engine assembly 10 also includes a first fan bearing assembly 110, a second fan bearing assembly 120, a third fan bearing assembly 130, and a fourth fan bearing assembly 140. First fan bearing assembly 110 includes a bearing race 112 and a rolling element 114 coupled within bearing race 112. Second fan bearing assembly 120 includes a bearing race 122 and a rolling element 124 coupled within bearing race 122. In the exemplary embodiment, fan bearing assemblies 110 and 120 are each thrust bearings that facilitate maintaining forward fan assembly 50 and aft fan assembly 52, respectively, in a relatively fixed axial position. Third fan bearing assembly 130 includes a bearing race 132 and a rolling element 134 that is coupled within bearing race 132. Fourth fan bearing assembly 140 includes a bearing race 142 and a rolling element 144 that is coupled within bearing race 142. In the exemplary embodiment, fan bearing assemblies 130 and 140 are each roller bearings that facilitate providing rotational support to aft fan assembly 52 such that aft fan assembly 52 can rotate freely with respect to forward fan assembly 50. Accordingly, fan bearing assemblies 130 and 140 facilitate maintaining aft fan assembly 52 in a relatively fixed radial position within counter-rotating fan assembly 16.

In the exemplary embodiment, gearbox support structure 102 is coupled to a stationary component. More specifically, and in the exemplary embodiment, fan bearing assembly 120 includes a rotating inner race 126 and a stationary outer race 128 such that rolling element 124 is coupled between races 126 and 128, respectively. More specifically, in the exemplary embodiment, gearbox input 104 is rotatably coupled to second drive shaft 34 via a drive shaft extension 136 that is splined to drive shaft 34, and a gearbox output 106 is rotatably coupled to aft fan assembly 52 via an output structure 138. More specifically, a first end of output structure 138 is splined to gearbox output 106 and a second end of output structure 138 is coupled to drive shaft 168 to facilitate driving aft fan assembly 52. Outer race 128 facilitates maintaining assembly gearbox 100 in a substantially fixed position within turbine engine assembly 10.

Gas turbine engine assembly 12 also includes at least one mechanical fuse 200 that is coupled between drive shaft 34 and gearbox input 104. More specifically, and in the exemplary embodiment, drive shaft extension 136 includes a first portion 210 and a second portion 212. First portion 210 is coupled to drive shaft 34 utilizing a plurality of splines 214, for example, second portion 212 is coupled to gearbox input 104 utilizing a plurality of splines 216, for example, and first portion 210 is coupled to second portion 212 utilizing a plurality of splines 218, for example. Accordingly, mechanical fuse 200 is coupled between first and second portions 210 and 212, respectively, such that drive shaft 34 is coupled to gearbox input 104.

In the exemplary embodiment, fuse 200 is approximately disk shaped and includes a radially inner portion 230 that is coupled to input 104 via splines 216 and a radially outer portion 232 that is coupled to first portion 210 via splines 218. Moreover, fuse 200 has a first thickness 240 proximate radially inner portion 230 and a second thickness 242, proximate radially outer portion 232, that is less than first thickness 240. More specifically, and in the exemplary embodiment, a thickness of disk or fuse 200 gradually decreases from radially inner portion 230 to radially outer portion 232. In the exemplary embodiment, second thickness 242 is selected such that first portion 230 will separate from second portion 232, i.e. fuse 200 will break, when fuse 200 is subjected to a load and/or torque between approximately 45% and approximately 55% of the total torque load on the low-pressure turbine drive shaft.

FIG. 4 is a schematic diagram of a portion of the counter-rotating fan assembly 16 shown in FIG. 2 including an exemplary mechanical fuse 300. Gas turbine engine assembly 12 also includes at least one mechanical fuse 300 that is coupled between drive shaft 34 and gearbox input 104. More specifically, and in the exemplary embodiment, drive shaft extension 136 includes a first portion 210 and a second portion 212. First portion 210 is coupled to drive shaft 34 utilizing a plurality of splines 214, for example, second portion 212 is coupled to gearbox input 104 utilizing a plurality of splines 216, for example, and first portion 210 is coupled to second portion 212 utilizing at least one mechanical fuse 300. Accordingly, mechanical fuse 300 is utilized to coupled first and second portions 210 and 212 together, such that drive shaft 34 is coupled to gearbox input 104. In the exemplary embodiment, a plurality of fuses are utilized to couple first and second portions 210 and 212 together.

During operation, as second drive shaft 34 rotates, second drive shaft 34 causes gearbox input 104 to rotate, which subsequently rotates gearbox output 106. Because bearing outer race 128 is coupled to aft fan assembly 52, second drive shaft 34 causes aft fan assembly 52 to rotate via gearbox 100 in an opposite second direction 82 than forward fan assembly 50. In the exemplary embodiment, gearbox 100 is located within a sump 160 defined between aft fan drive shaft 68 and a structural support member 162 configured to support aft fan assembly 52. During operation, gearbox 100 is at least partially submerged within lubrication fluid contained in sump 160. As such, gearbox 100 is facilitated to be continuously lubricated during engine operation.

Moreover, during operation of engine assembly 10, an imbalance of engine 10 may cause high radial forces to be applied to aft fan assembly 52 (shown in FIG. 1). To compensate for the relatively high radial stresses and to facilitate ensuring continued engine operation, the mechanical fuse 200 and/or 300 may break such that forward fan assembly 50 continues to operate.

The gas turbine engine assembly described herein includes a counter-rotating (CR) fan assembly having a geared single rotation (SR) low-pressure turbine. The assembly facilitates reducing at least some of the complexities associated with known counter-rotating low-pressure turbines. More specifically, the gas turbine engine assembly described herein includes a front fan that is rotatably coupled to a single rotation low-pressure turbine, and an aft fan assembly and booster assembly that are rotatably coupled together, and driven by, the low-pressure turbine via a gearbox. The aft fan assembly and booster assembly are driven at the same speed, which, in the exemplary embodiment, is approximately one-half the front fan speed. Additionally, the gas turbine engine assembly described herein is configured such that approximately 40% of power generated by the low-pressure turbine is transmitted through the gearbox to the aft fan assembly to facilitate reducing gear losses.

Moreover, the gas turbine engine assembly described herein includes a mechanical fuse that is formed by a circled spline and arm assembly that is coupled between the aft fan assembly and the low-pressure turbine drive shaft to facilitate protecting the drive shaft against gear lock up. More specifically, the mechanical fuse described herein will break in the unlikely event that full LPT torque is transmitted to the gearbox during gearbox seizure. Since the gearbox drives the aft fan assembly and booster assembly, the over torque condition with fuse activation will not affect the front fan assembly. As a result, the engine is still capable of producing a useful amount of thrust. More specifically, in the event of a gearbox failure, i.e. the aft fan assembly ceases to rotate, the front fan assembly will continue to operate since it is directly driven by the low-pressure turbine.

As a result, the gas turbine engine assembly described herein facilitates increasing fan efficiency, reducing fan tip speed, and/or reducing noise. Moreover, since the gas turbine engine assembly described herein does not include a counter-rotating low-pressure turbine to drive the counter-rotating fan assemblies, various components such as, but not limited to, an outer rotating spool, a rotating rear frame, a second low-pressure turbine shaft, and a low-pressure turbine outer rotating seal are eliminated, thus reducing the overall weight of the gas turbine engine assembly. Moreover, in some gas turbine engine applications a mid turbine frame may be eliminated utilizing the methods and apparatuses described herein.

Exemplary embodiments of a gas turbine engine assembly that includes a gearbox coupled to a fan assembly are described above in detail. The components are not limited to the specific embodiments described herein, but rather, components of each system may be utilized independently and separately from other components described herein. The gearbox described herein can also be used in combination with other known gas turbine engines that include a forward and an aft fan assembly.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
    coupling a low-pressure turbine to a core turbine engine;
    coupling a gearbox to the low-pressure turbine using a drive shaft;
    coupling a first fan assembly to the gearbox such that the first fan assembly rotates in a first direction;
    coupling a second fan assembly directly to the low-pressure turbine such that the second fan assembly rotates in a second direction opposite the first direction; and
    coupling a mechanical fuse that is approximately disk-shaped between the first fan assembly and the low-pressure turbine such that the mechanical fuse fails at a predetermined moment load, after the mechanical fuse fails at the predetermined moment load, second fan assembly remains driven by the low pressure turbine and the first fan assembly is decoupled from the low pressure turbine.

2. A method in accordance with claim 1 wherein coupling a mechanical fuse further comprises coupling a mechanical fuse between the first fan assembly and the gearbox such that the mechanical fuse fails between approximately 45% and approximately 55% of the total torque load on the low-pressure turbine drive shaft.

3. A method in accordance with claim 1 further comprising coupling a second fan assembly to the low-pressure turbine such that the first fan assembly rotates at a first rotational speed and the second fan assembly rotates at a second rotational speed that is different than the first rotational speed.

4. A method in accordance with claim 3 further comprising coupling a second fan assembly to the low-pressure turbine such that the first fan assembly rotates at a first rotational speed and the second fan assembly rotates at a second rotational speed that is approximately one-half the first rotational speed.

5. A method in accordance with claim 1 further comprising coupling a booster compressor to the second fan assembly such that the booster compressor rotates at the same rotational speed as the second fan assembly.

6. A method in accordance with claim 1 further comprising positioning the gearbox within an engine sump.

7. A counter-rotating fan assembly comprising:
a gearbox coupled to a low-pressure turbine using a drive shaft;
a first fan assembly coupled to said gearbox, said first fan assembly comprising a disk and a plurality of rotor blades coupled to said disk and configured to rotate in a first rotational direction;
a second fan assembly coupled to said low-pressure turbine such that said second fan assembly rotates in a second direction opposite the first direction; and
a mechanical fuse that is approximately disk-shaped coupled between said first fan assembly and said low-pressure turbine such that said mechanical fuse fails at a predetermined moment load, after the mechanical fuse fails at the predetermined moment load, second fan assembly remains driven by the low pressure turbine and the first fan assembly is decoupled from the low pressure turbine.

8. A counter-rotating fan assembly in accordance with claim 7 wherein said mechanical fuse is configured to fail between approximately 45% and approximately 55% of the total torque load on the low-pressure turbine drive shaft.

9. A counter-rotating fan assembly in accordance with claim 7 wherein said second fan assembly rotates at a second rotational speed that is different than the rotational speed of said first fan assembly.

10. A turbine engine assembly comprising:
a core turbine engine;
a low-pressure turbine coupled to said core turbine engine;
a gearbox coupled to said low-pressure turbine using a drive shaft;
a first fan assembly coupled to said gearbox, said first fan assembly comprising a disk and a plurality of rotor blades coupled to said disk and configured to rotate in a first rotational direction;
a second fan assembly coupled to said low-pressure turbine such that said second fan assembly rotates in a second direction opposite the first direction; and
a mechanical fuse that is approximately disk-shaped coupled between said first fan assembly and said low-pressure turbine such that said mechanical fuse fails at a predetermined moment load, after the mechanical fuse fails at the predetermined moment load, second fan assembly remains driven by the low pressure turbine and the first fan assembly is decoupled from the low pressure turbine.

11. turbine engine assembly in accordance with claim 10 wherein said mechanical fuse is coupled between a gearbox input and said low-pressure turbine.

12. turbine engine assembly in accordance with claim 10 wherein said mechanical fuse is configured to fail between approximately 45% and approximately 55% of the total torque load on the low-pressure turbine drive shaft.

13. A turbine engine assembly in accordance with claim 10 wherein said first fan assembly is configured to rotate at a first rotational speed and a second fan assembly is configured to rotate at a second rotational speed that is different than the first rotational speed.

14. turbine engine assembly in accordance with claim 13 wherein said second fan assembly is configured to rotate at a first rotational speed that is approximately one-half the rotational speed of the first fan assembly.

15. turbine engine assembly in accordance with claim 13 further comprising a booster compressor coupled to said second fan assembly such that said second fan assembly rotates at a rotational speed that is exactly the same as the rotational speed of the booster compressor.

16. turbine engine assembly in accordance with claim 10 wherein said gearbox is coupled within an engine sump.

* * * * *

UNITED STATES PATENT AND TRADEMARK OFFICE
CERTIFICATE OF CORRECTION

PATENT NO. : 7,603,844 B2 Page 1 of 1
APPLICATION NO. : 11/253415
DATED : October 20, 2009
INVENTOR(S) : Moniz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Fifth Day of October, 2010

David J. Kappos
*Director of the United States Patent and Trademark Office*